(12) United States Patent
Wang et al.

(10) Patent No.: US 11,513,842 B2
(45) Date of Patent: Nov. 29, 2022

(54) PERFORMANCE BIASED RESOURCE SCHEDULING BASED ON RUNTIME PERFORMANCE

(71) Applicant: International Business Machines Corporation, Armonk, NY (US)

(72) Inventors: Chen Wang, Chappaqua, NY (US); Stefania V. Costache, White Plains, NY (US); Alaa S. Youssef, Valhalla, NY (US); Ali Kanso, Elmsford, NY (US); Tonghoon Suk, Chappaqua, NY (US); Asser Narsreldin Tantawi, Somers, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 16/592,078

(22) Filed: Oct. 3, 2019

(65) Prior Publication Data
US 2021/0103468 A1 Apr. 8, 2021

(51) Int. Cl.
*G06F 9/48* (2006.01)

(52) U.S. Cl.
CPC ................... *G06F 9/4881* (2013.01)

(58) Field of Classification Search
None
See application file for complete search history.

(56) References Cited

U.S. PATENT DOCUMENTS

| 8,484,498 | B2* | 7/2013 | Branover | G06F 1/3215 713/323 |
| 8,656,023 | B1 | 2/2014 | Ho et al. | |
| 8,762,997 | B2 | 6/2014 | Moon et al. | |
| 8,793,381 | B2 | 7/2014 | Baughman et al. | |
| 8,863,137 | B2* | 10/2014 | Keller | G06F 9/5038 718/104 |
| 9,800,465 | B2* | 10/2017 | Steinder | H04L 41/0813 |
| 10,013,286 | B2 | 7/2018 | Chen et al. | |
| 10,140,164 | B2 | 11/2018 | Mehta et al. | |

(Continued)

OTHER PUBLICATIONS

Ernst et al. "Cross-Layer Mixed Bias Scheduling for Wireless Mesh Networks", 2010 IEEE, 5 pages.*

(Continued)

*Primary Examiner* — Van H Nguyen
(74) *Attorney, Agent, or Firm* — Amin, Turocy & Watson, LLP

(57) ABSTRACT

Systems, computer-implemented methods, and computer program products that can facilitate performance biased resource scheduling based on runtime performance of a certain workload type on one or more nodes are provided. According to an embodiment, a system can comprise a memory that stores computer executable components and a processor that executes the computer executable components stored in the memory. The computer executable components can comprise a performance component that assigns performance points to different nodes based on execution of one or more workload types. The computer executable components can further comprise a scheduler extender component that modifies a scheduling decision to run a workload type on a node based on the performance points.

17 Claims, 10 Drawing Sheets

600

602 — Assigning, by a system operatively coupled to a processor, performance points to different nodes based on execution of one or more workload types 604 — Modifying, by the system, a scheduling decision to run a workload type on a node based on the performance points

(56) References Cited

U.S. PATENT DOCUMENTS

| | | | |
|---|---|---|---|
| 10,171,313 B2 | 1/2019 | Diaz et al. | |
| 10,191,778 B1 | 1/2019 | Yang et al. | |
| 10,191,779 B2* | 1/2019 | Georgescu | G06F 9/5061 |
| 10,223,166 B2 | 3/2019 | Jamjoom et al. | |
| 10,509,685 B2* | 12/2019 | Gong | G06F 9/5077 |
| 10,871,998 B2* | 12/2020 | Parees | G06F 9/5027 |
| 2007/0083588 A1* | 4/2007 | Keller | G06Q 10/06 709/202 |
| 2009/0313631 A1* | 12/2009 | De Marzo | G06F 9/5038 718/103 |
| 2012/0185867 A1* | 7/2012 | Archer | G06F 9/5066 718/105 |
| 2018/0027058 A1 | 1/2018 | Balle et al. | |
| 2018/0321979 A1 | 11/2018 | Bahramshahry et al. | |
| 2018/0365055 A1 | 12/2018 | Bhimani et al. | |
| 2019/0034237 A1 | 1/2019 | Siddappa et al. | |
| 2019/0087301 A1 | 3/2019 | M et al. | |
| 2019/0095253 A1 | 3/2019 | Curtis et al. | |
| 2019/0114206 A1* | 4/2019 | Murugesan | H04L 47/54 |
| 2020/0293380 A1* | 9/2020 | Ashbaugh | G06F 9/4881 |

OTHER PUBLICATIONS

Zhang et al. "Evolutionary Scheduling of Dynamic Multitasking Workloads for Big-Data Analytics in Elastic Cloud", 2014 IEEE, pp. 338-351.*

Fernandez-Cerero et al. "Quality of cloud services determined by the dynamic management of scheduling models for complex heterogeneous workloads", 2018 IEEE, pp. 210-219.*

Anonymous, https://www.openstack.org/, Last accessed Sep. 26, 2019, 15 Pages.

Anonymous, https://kubernetes.io/, Last accessed Sep. 25, 2019, 8 pages.

Jyothi, et al., Morpheus: Towards Automated SLOs for Enterprise Clusters, Proceedings of the 12th USENIX Symposium on Operating Systems Design and Implementation, Nov. 4, 2016, pp. 117-134.

Tumanov, et al., TetriSched: global rescheduling with adaptive plan-ahead in dynamic heterogeneous clusters, Proceedings of the Eleventh European Conference on Computer Systems, Apr. 21, 2016, 16 Pages.

Zaharia, et al., Improving MapReduce performance in heterogeneous environments, 8th SENIX Symposium on Operating Systems Design and Implementation, pp. 29-42.

Farley, et al, More for your money: exploiting performance heterogeneity in public clouds, Proceedings of the Third ACM Symposium on Cloud Computing, Oct. 17, 2012, 14 Pages.

Bao, et al., Deep Learning-Based Job Placement In Distributed Machine Learning Clusters, IEEE Conference on Computer Communications, May 2, 2019, 9 Pages.

Rodriguez, et al., Containers Orchesliation With Cost-Efficient Autoscaling In Cloud Computing Environments, Dec. 2018, 22 Pages.

Vayghan, et al., Kubernetes As An Availability Manager For Microservice Applications, Jan. 15, 2019, 10 Pages.

Mao, et al., Learning Scheduling Algorithms For Data Processing Clusters, Aug. 21, 2019, 10 pages.

Boutin, et al., Apollo: Scalable and Coordinated Scheduling for Cloud-Scale Computing, Proceedings of the 11th USENIX Symposium on Operating Systems Design and Implementation, Oct. 8, 2014, pp. 285-300.

Lee, Resource allocation and scheduling in heterogeneous cloud environments, May 10, 2012, 113 pages.

Mao, et al., Resource Management with Deep Reinforcement Learning, Nov. 10, 2016, 7 pages.

Delgado, et al., Hawk: Hybrid datacenter scheduling, Proceedings of the 2015 USENIX Annual Technical Conference, Jul. 10, 2015, 49 pages.

Grandi, et al., Altruistic Scheduling in Multi-Resouice Clusters, Proceedings of the 12th USENIX Symposium on Operating Systems Design and Implementation, Nov. 4, 2016, pp. 65-80.

Soualhia, et al., ATLAS: An Adaptive Failure-aware Scheduler for Hadoop, IEEE 34th International Performance Computing and Communications Conference, Dec. 16, 2015, 8 pages.

Li, et al., Transforming Cooling Optimization for Green Data Center via Deep Reinforcement Learning, Jul. 18, 2018, 11 Pages.

Berral, et al., Adaptive Scheduling on PoweGRID r-Aware Managed Data-Centers using Machine Learning, GRID Proceeding of the 2011 IEEE, Sep. 23, 2011, 8 pages.

Carastan-Santos, et al., Obtaining Dynamic Scheduling Policies with Simulation and Machine Learning, International Conference for High Performance Computing, Networking, Storage and Analysis (Supercomputing), Nov. 2017, 14 Pages.

Sindhu, et al., A genetic algorithm based scheduler for cloud environment, 4th International Conference on Computer and Communication Technology, Sep. 22, 2013, 5 Pages.

Koufaty, et al., Bias scheduling in heterogeneous multi-core architectures, Apr. 16, 2010, 14 pages.

Aydin, et al., Optimal reward-based scheduling for periodic real-time tasks, IEEE Transactions on Computers, Feb. 2001, 11 Pages, vol. 50, Issue 2.

Mel, et al., The NIST Definition of Cloud Computing, National Institute of Standards and Technology Special Publication 800-145, Sep. 2011, 7 Pages.

* cited by examiner

| Nodes<br>Pod types | Worker 1 | Worker 2 | ... | Worker N |
|---|---|---|---|---|
| Pod type 1 | 1.0 | 1.0 | | 0.8 |
| Pod type 2 | 0.8 | 0.2 | | 1.0 |
| ... | | | | |

500 ← 502

504
◉ Enable performance biased scheduling

FIG. 5

PERFORMANCE BIASED RESOURCE SCHEDULING BASED ON RUNTIME PERFORMANCE

BACKGROUND

The subject disclosure relates to resource scheduling, and more specifically, to performance biased resource scheduling based on runtime performance of a certain workload type on one or more nodes.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate performance biased resource scheduling based on runtime performance of a certain workload type on one or more nodes are described.

According to an embodiment, a system can comprise a memory that stores computer executable components and a processor that executes the computer executable components stored in the memory. The computer executable components can comprise a performance component that assigns performance points to different nodes based on execution of one or more workload types. The computer executable components can further comprise a scheduler extender component that modifies a scheduling decision to run a workload type on a node based on the performance points.

According to another embodiment, a computer-implemented method can comprise assigning, by a system operatively coupled to a processor, performance points to different nodes based on execution of one or more workload types. The computer-implemented method can further comprise modifying, by the system, a scheduling decision to run a workload type on a node based on the performance points.

According to another embodiment, a computer program product facilitating performance biased resource scheduling based on runtime performance of a certain workload type on one or more nodes is provided. The computer program product comprising a computer readable storage medium having program instructions embodied therewith, the program instructions executable by a processor to cause the processor to assign, by the processor, performance points to different nodes based on execution of one or more workload types. The program instructions are further executable by the processor to cause the processor to modify, by the processor, a scheduling decision to run a workload type on a node based on the performance points.

DESCRIPTION OF THE DRAWINGS

FIG. 5 illustrates a diagram of an example, non-limiting information that can facilitate performance biased resource scheduling based on runtime performance of a certain workload type on one or more nodes in accordance with one or more embodiments described herein.

DETAILED DESCRIPTION

Figure 1:
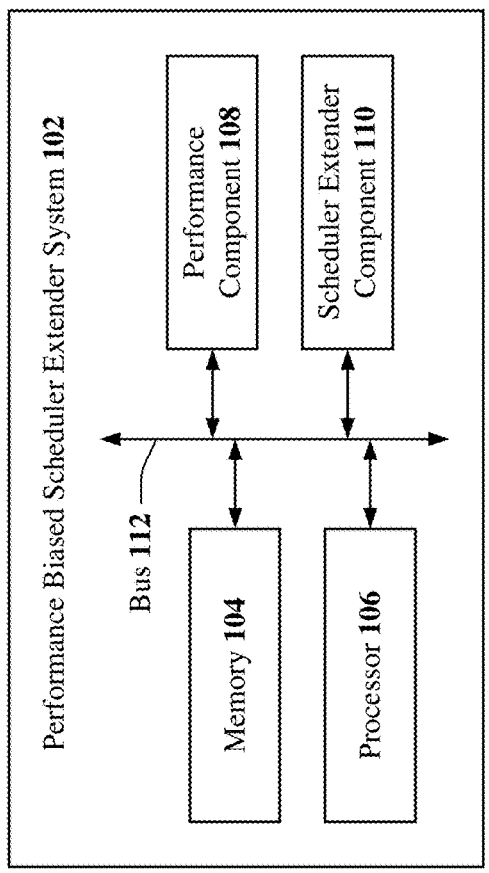
FIG. 1 illustrates a block diagram of an example, non-limiting system that can facilitate performance biased resource scheduling based on runtime performance of a certain workload type on one or more nodes in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout, In the following description, for purposes of explanation, numerous specific details are set forth in order to provide a more thorough understanding of the one or more embodiments. It is evident, however, in various cases, that the one or more embodiments can be practiced without these specific details.

Cloud systems are large-scale distributed infrastructures that utilize efficient scalable resource scheduling. The resource scheduling is usually controlled by schedulers that assign workers to run workloads in a cluster, Workers can be either virtual machines or physical machines.

Resource scheduling is usually constrained by multiple objectives. Common objectives imply maximizing the return of investment of the cloud, reducing the power consumption and providing good load balancing, while meeting workload performance constraints and resource preferences. There are two key challenges in satisfying all these objectives. First, obtaining an optimal scheduling strategy is a nondeterministic polynomial (NP) complete problem that can be solved using efficient approximation algorithms. Second, the scheduling performance relies on accurate information about the current and future state of the cloud.

Nevertheless, cloud infrastructures are dynamic systems, where components are prone to failures. Information about consumed resources is often imprecise, misleading, or not available. Predicting accurately as well as controlling the behavior of all the components, is difficult, if not impossible. Various issues in workers are inevitable and can cause failures, performance issues in workloads.

This is the case for container cloud systems. For example, tenants' workload can run in containers, for Which an amount of resources in terms of central processing unit (CPU) and memory are allocated on workers, where such containers can each comprise an executable package of stand-alone software that can share a single operating system kernel with multiple other containers and can execute (run) on the same virtual machine as multiple other containers. However, other resources are shared among containers (e.g., limit on open file descriptors, container image availability, etc.), which are not reported to, and not considered by the scheduler. Such resources can be denoted as "hidden" resources (also referred to as "unknown" resources) to the scheduler. Lack of information about such "hidden" resource usage leads to placing those "hidden" resource intensive workloads on workers that run out of these resources. This further degrades the run time performance of workloads or even cause failures of workload on these workers. Such failures can hardly be predicated in advance as different workload may request different types of resources and they consume resources in different ways.

Different types of workloads (e.g., containers, pods comprising a group of containers deployed together on the same host, etc.) fail on different workers and certain types of workloads cannot be placed (run) on some workers. For instance, certain types of workloads (e.g., containers, pods, etc.) fail on only a set of nodes and they fail repetitively. Such failures commonly happen in a container Cloud. For example, containers running the training of deep neural networks, request workers with proper versions of graphics processing unit (GPU) drivers installed. Placing containers on workers installed with other types of drivers lead to failures in training workload. Another example can be the hardware compatibility issue. If containers with workload using certain number of GPUs are placed on workers without enough GPUs, the workload will fail. Various types of workloads may utilize different drivers and/or hardware resources, In a large-scale cluster with heterogeneous workloads, monitoring all types of resource availability and verifying the successful installation of all software that can be utilized for all possible workload is nearly impossible. Mistakenly placing (e.g., scheduling, running, etc.) workloads on iii equipped workers causes failures. Unaware of the workload use of certain software and/or hardware can lead to repetitive mistakes of placing containers on workers that do not provide the hidden resource, software, and/or hardware, Such scheduling can cause repetitive failures and/or performance degradations of workloads.

Some existing scheduling approaches (e.g., open source cloud schedulers) filter and sort nodes based on metrics that combine commonly known allocated resources (e.g., central processing unit (CPU), memory, storage, etc.), and assign the workload using a first-come-first-served or priority-based policy. In addition, there exists some research work that complements these heuristics through a variety of meta-heuristics designed to find a close-to-optimal solution in a timely fashion. However, a problem with these approaches is that they rely on well-known information and do not consider the real resource consumption of the workloads. There also exists other research work focused on fast high-throughput scheduling, where multiple schedulers distribute the workload using observed runtime performance metrics (e.g., the execution time of tasks on nodes) to avoid contended nodes and prevent potential task failures, While introducing randomness in the selection policy to limit scheduling conflicts. However, a problem with these solutions is that they are designed for specific workloads (e.g., data analytics), while a cloud infrastructure can manage more varied workloads and/or resources. Additionally, some recent approaches use machine learning in scheduling to compute efficient job schedules by considering global objectives e.g., minimizing the job slowdown)) and a coarse-grain representation of the cloud state, for example. However, a problem with such recent approaches is that they do not consider how placement of individual job containers affect the overall job and system performance.

A problem with such existing scheduling technologies (approaches, solutions, systems, etc.) described above is that they do not consider (e.g., account for) runtime failures and/or performance issues (e.g., degradation) of workloads run on specific workers in a scheduler. For instance, such existing scheduling technologies do not consider such failures and/or performance issues that can result from the combination of a certain workload and a certain worker. Some of the most resilient existing scheduling technologies only consider failures and/or performance issues caused by either the workload or the worker(s), but not the failures and/or performance issues resulting from the combination of a certain workload on one certain worker.

Another problem with such existing scheduling technologies is that they do not solve (e.g., detect and/or mitigate) workload performance degradation and/or failures caused by "hidden" resources, software, and/or hardware that are not provided on certain workers that are scheduled to execute a certain workload type. For instance, such existing scheduling technologies do not prevent such scheduling mistakes that may occur repetitively, even if the scheduler is not aware of the "hidden" resource, software, and/or hardware used by the workloads.

Given the problems described above with current scheduling technologies, the present disclosure can be implemented to produce a solution to such problems in the form of systems, computer-implemented methods, and/or computer program products that can assign performance points to different nodes based on execution (e.g., based on runtime performance issues, degradation, failures, successful completion, etc.) of one or more workload types and/or modify a scheduling decision (e.g., of a scheduler) to run a certain workload type on a certain node based on the performance points.

FIG. 1 illustrates a block diagram of an example, non-limiting system 100 that can facilitate performance biased resource scheduling based on runtime performance of a certain workload type on one or more nodes in accordance with one or more embodiments described herein. In some embodiments, system 100 can comprise a performance biased scheduler extender system 102, which can be associated with a cloud computing environment. For example, performance biased scheduler extender system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

In some embodiments, performance biased scheduler extender system 102 and/or components thereof (e.g., performance component 108, scheduler extender component 110, workload clustering component 202, workload classification component 204, scheduler component 206, cache component 208, etc.) can employ one or more computing resources of cloud computing environment 950 described below with reference to FIG. 9 and/or one or more functional abstraction layers described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.) and/or one or more quantum computing devices (e.g., quantum computer, quantum processor, quantum circuit simulation software, superconducting circuit, etc.) that can be employed by performance biased scheduler extender system 102 and/or components thereof to execute one or more operations in accordance with one or more embodiments of the subject disclosure described herein. For instance, performance biased scheduler extender system 102 and/or components thereof can employ such one or more classical and/or quantum computing devices to execute one or more mathematical functions and/or equations, one or more computing and/or processing scripts, one or more models artificial intelligence (AI) models, machine learning (ML) models, etc.), one or more classical and/or quantum algorithms, and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time, Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1. According to several embodiments, performance biased scheduler extender system 102 can comprise a memory 104, a processor 106, a performance component 108, a scheduler extender component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or performance biased scheduler extender system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to performance biased scheduler extender system 102, performance component 108, scheduler extender component 110, and/or another component associated with performance biased scheduler extender system 102 (e.g., workload clustering component 202, workload classification component 204, scheduler component 206, cache component 208, etc.), as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output WO), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and HG. 8. Such examples of processor 106 can be employed to implement any embodiments of the subject disclosure.

Performance biased scheduler extender system 102, memory 104, processor 106, performance component 108, scheduler extender component 110, and/or another component of performance biased scheduler extender system 102 as described herein can be communicatively, electrically, operatively, and/or optically coupled to one another via a bus 112 to perform functions of system 100, performance biased scheduler extender system 102, and/or any components coupled therewith. In several embodiments, bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Performance biased scheduler extender system 102 can comprise any type of component, machine, device, facility, apparatus, and/or instrument, that comprises a processor and/or can be capable of effective and/or operative communication with a wired and/or wireless network. All such embodiments are envisioned. For example, performance biased scheduler extender system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Performance biased scheduler extender system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, performance biased scheduler extender system 102 can be coupled (e.g., communicatively, electrically, operatively, optically, etc.) to one or more external systems, sources, and/or devices e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, performance biased scheduler extender system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced CPRS), third generation partnership project (3GPP) long term evolution (LTE), third generation partnership project 2 (3GPP2) ultra mobile broadband (UMB), high speed packet access (HSPA), Zigbee and other 802.XX: wireless technologies and/or legacy telecommunication technologies, BLUETOOTH®, Session Initiation Protocol (SIP), ZIG- BEE®, RF4CE protocol, WirelessHART protocol, 6LoW-PAN (IPv6 over Low power Wireless Area Networks), Z-Wave, an ANT, an ultra-wideband (UWB) standard protocol, and/or other proprietary and non-proprietary communication protocols. In such an example, performance biased scheduler extender system 102 can thus include hardware (e.g., a central processing unit (CPU), a transceiver, a decoder, a quantum processor, etc.), software (e.g., a set of threads, a set of processes, software in execution, quantum pulse schedule, quantum circuit, etc.) or a combination of hardware and software that facilitates communicating information between performance biased scheduler extender system 102 and external systems, sources, and/or devices (e.g., computing devices, communication devices, etc.).

Performance biased scheduler extender system 102 can comprise one or more computer and/or machine readable, writable, and/or executable components and/or instructions that, When executed by processor 106 (e.g., a classical processor, a quantum processor, etc.), can facilitate performance of operations defined by such component(s) and/or instruction(s). Further, in numerous embodiments, any component associated with performance biased scheduler extender system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, performance component 108, scheduler extender component 110, and/or any other components associated with performance biased scheduler extender system 102 as disclosed herein (e.g., communicatively, electronically, operatively, and/or optically coupled with and/or employed by performance biased scheduler extender system 102), can comprise such computer and/or machine readable, writable, and/or executable component(s) and/or instruction(s), Consequently, according to numerous embodiments, performance biased scheduler extender system 102 and/or any components associated therewith as disclosed herein, can employ processor 106 to execute such computer and/or machine readable, writable, and/or executable component(s) and/or instruction(s) to facilitate performance of one or more operations described herein with reference to performance biased scheduler extender system 102 and/or any such components associated therewith.

Performance biased scheduler extender system 102 can facilitate performance of operations executed by and/or associated with performance component 108, scheduler extender component 110, and/or another component associated with performance biased scheduler extender system 102 as disclosed herein (e.g., workload clustering component 202, workload classification component 204, scheduler component 206, cache component 208, etc.). For example, as described in detail below, performance biased scheduler extender system 102 can facilitate via processor 106 (e.g., a classical processor, a quantum processor, etc.): assigning performance points to different nodes (also referred to as workers and/or worker nodes) based on execution of one or more workload types; and/or modifying a scheduling decision to run a workload type on a node based on the performance points, In another example, performance biased scheduler extender system 102 can further facilitate via processor 106 (e.g., a classical processor, a quantum processor, etc.): determining at least one of a quantity or a type of the one or more workload types; classifying the workload type as one of the one or more workload types; monitoring runtime performance of at least one of the workload type run on the node or the one or more workload types run on the different nodes; updating one or more performance points of at least one of the node or the different nodes based on the runtime performance; ranking the different nodes based on one or more performance points of the different nodes corresponding to the workload type; and/or adjusting a scheduler ranking of the different nodes based on one or more performance points of the different nodes corresponding to the workload type, thereby facilitating improved performance of at least one of the workload type, the node, or the processor. In some embodiments, performance biased scheduler extender system 102 can facilitate via processor 106 (e.g., a classical processor, a quantum processor, etc.) assigning the performance points based on at least one of: runtime performance of at least one of the different nodes in executing the one or more workload types; failure rate of the one or more workload types executed by at least one of the different nodes; one or more attributes of at least one of the different nodes; one or more attributes of the one or more workload types; or at least one defined workload execution objective.

Performance component 108 can assign performance points to different nodes based on execution of one or more workload types. For example, performance component 108 can assign performance points comprising numerical values e.g., 0, 1, etc.) to different computing nodes (e.g., cloud computing nodes 910, computing devices 954A, 954B, 954C, 954N, etc.) of a cloud computing environment (e.g., cloud computing environment 950) based on execution (e.g., successful execution, run failure, performance degradation, etc.) of one or more workload types (e.g., container(s), pod(s), etc.) by such different computing nodes.

In an example, performance component 108 can assign the performance points based on runtime performance (e.g., successful execution, run failure, performance degradation, etc.) of one or more of such different nodes described above that execute the one or more workload types. For instance, performance component 108 can assign performance points comprising a numerical value of 1 to denote successful execution of the one or more workload types by the different nodes. In another example, performance component 108 can assign performance points comprising a numerical value between 0-1 to denote a partially successful execution of the one or more workload types by the different nodes. In another example, performance component 108 can assign performance points comprising a numerical value of 0 to denote unsuccessful execution (e.g., run failure, performance degradation, etc) of the one or more workload types by the different nodes. In another example, performance component 108 can assign performance points comprising a numerical value between 0-1 to denote a partially unsuccessful execution (e.g., partial run failure, partial performance degradation, etc.) of the one or more workload types by the different nodes.

In another example, performance component 108 can assign the performance points based on failure rate of the one or more workload types executed by one or more of the different nodes. For instance, if a certain workload type X fails frequently on a certain node Y, then performance component 108 can assign a low performance point value (e.g., a numerical value ranging between 0-1) corresponding to node Y to reflect such repeated failure of the workload type X on the node Y.

In another example, performance component 108 can assign the performance points based on one or more attributes of at least one of the different nodes. For instance, performance component 108 can assign the performance points based on one or more attributes of the different nodes including, but not limited to, hardware and/or software resources, installed drivers, and/or another attribute.

In another example, performance component 108 can assign the performance points based on one or more attributes of the one or more workload types. For instance, performance component 108 can assign the performance points based on one or more attributes of the one or more workload types including, but not limited to, workload criteria (e.g., pod running time before crash, user response time, job execution time, a customized metric, etc.), resources, hardware, and/or software used by a workload, hidden (e.g., unknown to a scheduler) resources, hardware, and/or software used by a workload, and/or another attribute.

In another example, performance component 108 can assign the performance points based on one or more defined workload execution objectives. For instance, performance component 108 can assign the performance points based on one or more defined workload execution objectives defined by an entity implementing performance biased scheduler extender system 102 and/or one or more components thereof in accordance with one or more embodiments described herein. For example, performance component 108 can assign the performance points based on one or more defined workload execution objectives defined by an entity using an interface component of performance biased scheduler extender system 102 an application programming interface (API), a representational state transfer API, a graphical user interface (GUI), etc.), In several embodiments, such an entity can include, but not limited to, a human, a client, a user, a computing device, a software application, an agent, a machine learning (ML) model, an artificial intelligence (AI) model, and/or another entity.

To facilitate assigning the performance points, performance component 108 can employ a performance point function to calculate the performance points. For example, performance component 108 can calculate the performance points using a sliding window average method, an exponential weighted average method, and/or another performance point function that can provide a performance point value(s) of 0, 1, and/or some value between 0-1 (e.g., to denote successful execution, partially successful execution, unsuccessful execution, and/or partially unsuccessful execution as described above), In another example, performance component 108 can employ a performance point function that can determine the performance points based on, for example, the one or more attributes of the workload types defined above and/or the one or more defined workload execution objectives. In an example, performance component 108 can employ a performance point function that can be defined by an entity based on one or more applications used by' the entity and/or one or more objectives of the entity, In this example, the entity can define the performance point function using a performance point function definition portal a questionnaire input box) of an interface component (e.g., an API, a REST API, a GUI, etc.) of performance biased scheduler extender system 102.

In an embodiment comprising a web application(s), the entity described above can define (e.g., via the performance point function definition portal) the following performance point function R(t):

$$R(t) = \begin{cases} 1 - t & t < 1s \\ 0 & t \geq 1s \end{cases}$$

where t denotes response time and s denotes seconds.

In an embodiment comprising a long-running application(s), the entity described above can define (e.g., via the performance point function definition portal) the following performance point function R(n) where the pod fails in n days:

$$R(n) = \begin{cases} 1 - \dfrac{1}{n} & n \geq 1 \\ 0 & n < 1 \end{cases}$$

In an embodiment comprising a job(s) with a deadline(s), the entity described above can define (e.g., via the performance point function definition portal) the following performance point function R(t, T):

$$R(t, T) = \begin{cases} 1 & t \leq T \\ 0 & t \geq T \end{cases}$$

where T denotes job deadline and t denotes job execution time.

Performance component 108 can assign initial performance points to the different nodes, for instance, when no information is available about previous execution(s) of the one or more workload types on one or more of the different nodes. For example, at initial implementation (e.g., time=0 (t=0)) of performance biased scheduler extender system 102, performance component 108 can assign an initial performance point value (e.g., 0.5) to all of the different nodes for all workload types. In another example, when one or more of the different nodes have not previously attempted to execute a certain workload type, performance component 108 can assign an initial performance point value (e.g., 0.5) to such node(s).

Performance component 108 can update one or more previously assigned performance points of one or more of the different nodes. For example, performance component 108 can update a performance point(s) of a node(s) by using one or more of the performance point assignment approaches described above that can be employed by performance component 108 to assign the performance points.

Performance component 108 can update one or more performance points of one or more nodes based on runtime performance. For example, performance component 108 can update (e.g., using one or more of the performance point assignment approaches described above) a performance point(s) of a node(s) based on runtime performance observed (e.g., monitored) by performance component 108 as described below.

Performance component 108 can monitor runtime performance of one or more workload types run on different nodes. For example, performance component 108 can be implemented on different computing nodes (e.g., cloud computing nodes 910, computing devices 954A, 954B, 954C, 954N, etc.) to facilitate such monitoring of runtime performance of the workload type(s) run on the different computing nodes. For instance, performance component 108 can be implemented (e.g., installed, loaded, run, etc.) on such different computing nodes to monitor the running state of each workload type (e,g., each pod type) executed on the different computing nodes. In these examples, performance component 108 can further update one or more performance points of one or more of the different nodes (e.g., as described above) based on such runtime performance.

Performance component 108 can report performance points of the different nodes to a cache component (e.g., a cache memory device, a memory device, etc.). For example, performance component 108 can assign and/or update performance points in accordance with one or more of the embodiments described herein and further input the assigned and/or updated performance point values into a performance cache table (e.g., a matrix) that can be stored on a cache component such as, for instance, cache component 208 described below with reference to FIG. 2.

Performance component 108 can comprise an agent (e.g., a monitoring agent, an application, software script, processing threads, etc.) that can update and/or report performance points based on the runtime status of workloads (e.g., pods) executed by different nodes. For instance, once a type of workload has been placed scheduled, implemented, run, executed, etc.), performance component 108, which can comprise such an agent installed on each node, can monitor the runtime performance of the workload executed by each node and adjust the performance point on the node accordingly. For example, performance component 108 can update (e.g., increase) a performance point value of a node to the numerical value of 1 if the workload is running correctly on the node. In another example, performance component 108 can update (e.g., increase) a performance point value of a node to some value between 0-1 if the workload is running partially correct on the node. In another example, performance component 108 can update (e.g., decrease) a performance point value of a node to the numerical value of 0 if the node fails to execute a function and/or service of the workload. In another example, performance component 108 can update (e.g., decrease) a performance point value of a node to some value between 0-1 if the node partially fails to execute a function and/or service of the workload. In these examples, if a workload (e.g., a pod) fails and falls into the crash loop backoff, it can be regarded as a failure or a partial failure and performance component 108 can update and/or report a performance point value of 0 or some value between 0-1. If a workload (e,g., a. pod) runs normally, it can indicate it is performing correctly or partially correct and performance component 108 can update and/or report a performance point value of 1 or some value between 0-1.

In an example, when a node fails to successfully execute a certain workload type, a similar workload type, or one or more different workload types (e.g., when such workload type(s) fail when run on the node), the node can have a lower relative ranking (e.g., a lower relative performance point based ranking) with respect to all other nodes of a system after biasing by scheduler extender component 110 as described below. Oppositely, in another example, when a node successfully executes a certain workload type, a similar workload type, or one or more different workload types (e.g., when functions and/or services of the workload are successfully performed on the node), the node can have a higher relative ranking (e.g., a higher relative performance point based ranking) with respect to all other nodes of a system after biasing by scheduler extender component 110 as described below.

To facilitate determination of such relative ranking of nodes based on performance points as described above (e.g., a relative performance point based ranking), performance component 108 can update performance points corresponding to such node(s) in a performance cache table that can be accessed by scheduler extender component 110 to determine such relative rankings. For example, given a certain workload type to be placed scheduled, executed) by performance biased scheduler extender system 102, scheduler extender component 110 can access such a performance cache table (e.g., performance cache table 306 illustrated in FIG. 3) to determine which node(s) has the highest performance point value, and thus the highest relative ranking (e.g., the highest relative performance point based ranking), for running the certain workload type. In this example, it should therefore be appreciated that performance component 108 can enable an entity (e.g., a user) employing performance biased scheduler extender system 102 to infer (e.g., predict) the heterogeneity of the different nodes in terms of failures and/or successful executions (performances) for various workload types (e.g., applications) and thereby facilitate detection and/or mitigation at run time of failures and/or performance degradations that can result by placing a certain type of workload on a certain node(s).

Scheduler extender component 110 can modify a scheduling decision to run a workload type on a node based on performance points. For example, scheduler extender component 110 can modify a scheduling decision (e.g., a scheduling decision generated by a scheduler) to run a certain workload type on a certain node based on the performance points of the different nodes that can be assigned, updated, and/or reported by performance component 108 as described above.

To facilitate such modifying of a scheduling decision, scheduler extender component 110 can rank the different nodes based on one or more performance points of the different nodes corresponding to the workload type. For example, scheduler extender component 110 can rank the different nodes of a system (e,g., cloud computing nodes 910 of cloud computing environment 950) using performance point(s) assigned to each of the different nodes after each of them run, or attempt to run, a certain workload type via performance component 108 as described above). As described above, such performance points of the different nodes can be input to (e.g., via performance component 108) a performance cache table (e.g., performance cache table 306) that can be stored on a cache component (e.g., cache component 208) and accessed by scheduler extender component 110 to determine a performance point based ranking (e,g., a. relative performance point based ranking) of the different nodes with respect to a certain workload type. For example, scheduler extender component 110 can access such a performance cache table to determine a relative performance point based ranking of each of the different nodes, where a high relative ranking can correspond to a high performance point value (e.g., a numerical value of 1 or some value between 0-1) and/or a low relative ranking can correspond to a low performance point value (e.g., a numerical value of 0 or some value between 0-1), In an embodiment, given a certain workload type to be placed (e.g., scheduled, executed) by performance biased scheduler extender system 102, scheduler extender component 110 can utilize such a performance cache table to determine which node(s) has the highest performance point value, and thus the highest relative ranking (e.g., the highest relative performance point based ranking), for running the certain workload type.

Scheduler extender component 110 can adjust a scheduler ranking of the different nodes based on one or more performance points of the different nodes corresponding to a workload type. For example, scheduler extender component 110 can adjust a scheduler ranking generated by a scheduler component (e.g., scheduler component 206 described below with reference to FIG. 2), where such a scheduler component generates the scheduler ranking to rank the different nodes based on certain criteria such as, for instance, predefined priorities and/or predicate functions (e.g., to maximize node resource utilization, to maximize the balance of node workload, etc.).

Scheduler extender component 110 can obtain such a scheduler ranking from a scheduler component and bias (e.g., adjust) the ranking based on the performance points of the different nodes cached (e.g., via performance component 108) in the performance cache table described above performance cache table 306). For example, scheduler extender component 110 can bias the scheduler ranking by adjusting (e.g., modifying) the ranking order of one or more of the different nodes in the scheduler ranking according to a performance point based ranking (e.g., a relative performance point based ranking) of the different nodes that can he determined by scheduler extender component 110 as described above. For instance, scheduler extender component 110 can bias the scheduler ranking by adjusting (e.g., modifying) the ranking order of one or more of the different nodes in the scheduler ranking to reflect a ranking order of one or more of the different nodes in a performance point based ranking (e.g., a relative performance point based ranking) of the different nodes that can be determined by scheduler extender component 110 as described above.

In another example, scheduler extender component 110 can bias the scheduler ranking by replacing the scheduler ranking of the different nodes generated by such a scheduler component with a performance point based ranking (e.g., a relative performance point based ranking) of the different nodes that can be determined by scheduler extender component 110 as described above. In another example, scheduler extender component 110 can bias the scheduler ranking by applying a weighted approach to the scheduler ranking generated by such a scheduler component. For instance, scheduler extender component 110 can obtain the performance points cached in a cache component (e.g., cache component 208) corresponding to certain workload type previously run on the different nodes and assign weights to the rankings of the different nodes in the scheduler ranking generated by the scheduler component. In this example, scheduler extender component 110 can thereby create a performance point biased ranking (e.g., a relative performance point based ranking) that can reflect not only the rankings of the different nodes as determined by a scheduling component but also the rankings of the different nodes relative to the performance points. In this example, scheduler extender component 110 can thereby bias the ranking of the different nodes based on performance points (e.g., expected performance points) of the different nodes that can run a certain workload type. In this example, based on such a performance point based ranking (e.g., a performance point biased ranking) of the different nodes, scheduler extender component 110 can place (e.g., schedule, execute) the certain workload type on a node with highest expected performance point (i.e., with the highest relative performance point based ranking).

Scheduler extender component 110 can comprise an extension of a scheduler component in a cloud computing environment. In the examples described above, such biasing by scheduler extender component 110 (e.g., adjusting, modifying, replacing, weighting, etc.) of a scheduler ranking generated by such a scheduler component can constitute modifying by scheduler extender component 110 a scheduling decision to run a workload type on a node based on performance points of the different nodes. For example, given a certain type of workload, scheduler extender component 110 can modify such a scheduling decision by biasing (e.g., as described above) the scheduler rankings with respect to a certain node(s) with high performance points observed in the past. For instance, if more failures and/or performance degradations are observed on one node, scheduler extender component 110 can adjust a scheduler ranking corresponding to the node and/or scheduler rankings of other nodes such that a certain type of workload and/or a similar workload type will not be placed on the node.

Figure 2:
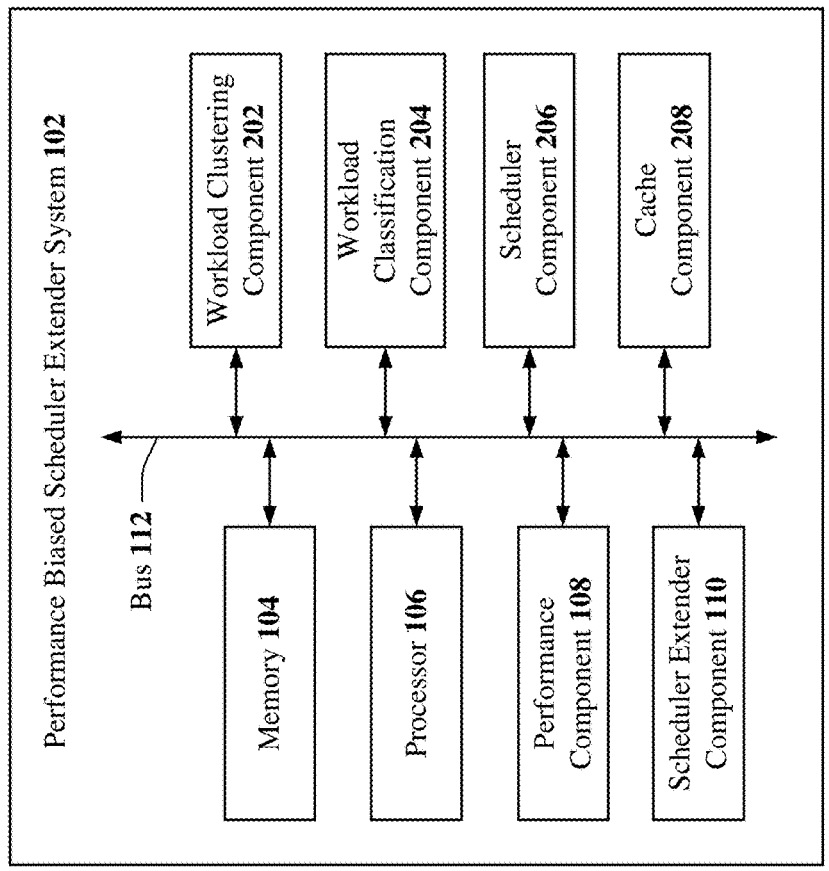
FIG. 2 illustrates a block diagram of an example, non-limiting system that can facilitate performance biased resource scheduling based on runtime performance of a certain workload type on one or more nodes in accordance with one or more embodiments described herein.

FIG. 2 illustrates a block diagram of an example, non-limiting system 200 that can facilitate performance biased resource scheduling based on runtime performance of a certain workload type on one or more nodes in accordance with one or more embodiments described herein. In some embodiments, system 200 can comprise performance biased scheduler extender system 102. In some embodiments, performance biased scheduler extender system 102 can comprise a workload clustering component 202, a workload classification component 204, a scheduler component 206, and/or a cache component 208. Repetitive description of like elements and/or processes employed in respective embodiments is omitted for sake of brevity.

Workload clustering component 202 can determine at least one of a quantity or a type of one or more workload types, For example, workload clustering component 202 can determine how many types of workloads in general can be scheduled in a system using one or more clustering techniques.

Workload clustering component 202 can determine at least one of a quantity or a type of one or more workload types utilizing one or more clustering techniques (e.g., a clustering algorithm, a machine learning (ML) model implementing a clustering algorithm, etc.) to cluster observed applications based on one or more features of the applications. In an example, workload clustering component 202 can employ such a clustering technique (e.g., K-means clustering, mean-shift clustering, etc.) to cluster observed applications based on features of the container images they run such as, for instance, container image repo, image name, and/or image version. In another example, workload clustering component 202 can employ such a clustering technique (e,g., K-means clustering, mean-shift clustering, etc.) to cluster observed applications based on features of the packages, binaries, and/or files running in all containers in a pod.

Workload clustering component 202 can cluster workload types into different categories. For example, workload clustering component 202 can cluster workload types into different categories based on previous runtime performance of different nodes that have executed the workload types. For instance, within each category, a certain workload type has failed similarly on the same node and/or has performed similarly on the same node.

Workload clustering component 202 can comprise pod clustering in a container Cloud. For instance, workload clustering component 202 can comprise pod clustering in a container Cloud as described below and illustrated in the diagram depicted in FIG. 4, which can comprise a pod clustering diagram.

Workload classification component 204 can classify a workload type as one of one or more workload types. For example, workload classification component 204 can classify an incoming workload as one of the one or more workload types determined by workload clustering component 202 as described above.

Workload classification component 204 can classify a workload type as one of one or more workload types using one or more classification techniques (e.g., a classification algorithm, a machine learning (ML) model implementing a classification algorithm, etc.). For example, workload classification component 204 can employ such a classification technique (e.g., structured data classification, feature classification, multi class classification, logistic regression, naïve Bayes, stochastic gradient descent, K-nearest neighbors, decision tree, random forest, support vector machine, etc.) to classify a workload type as one of one or more workload types based on one or more features of the workload type. For example, workload classification component 204 can classify an incoming workload as one of one or more workload types based on features such as, for instance, the container images it runs.

Workload classification component 204 can be a pod classification service in a container Cloud. For example, an incoming pod to a container Cloud management system can be classified by workload classification component 204 according to images of the containers in the pod.

Scheduler component 206 can generate a scheduler ranking of one or more nodes of a system to place a workload on a node(s). For example, scheduler component 206 can generate a scheduler ranking of one or more nodes of a system (e.g., cloud computing nodes 910 of cloud computing environment 950) based on certain criteria (e.g., to maximize node resource utilization, to maximize the balance of node workload, etc.), where such scheduler ranking can be used to place a workload on a node(s). For instance, scheduler component 206 can generate a scheduler ranking of one or more nodes of a system based on such certain criteria using one or more scheduling algorithms (e.g., first come first serve (FCFS) scheduling, shortest-job-first (SJF) scheduling, priority scheduling, round robin (RR) scheduling, multilevel queue scheduling, etc.), where such a ranking of nodes is indicative of where a workload (e.g., a pod) can be placed (e.g., run). In an embodiment, scheduler component 206 can generate a scheduler ranking that can be biased (e.g., adjusted, modified, replaced, weighted, etc.) by scheduler extender component 110 as described above with reference to FIG. 1.

Cache component 208 can store a performance cache table comprising performance points assigned to different nodes of a system based on execution of one or more workload types by the different nodes. For example, can comprise a memory component (e.g., a cache memory device, a memory device, memory 104, etc.) that can store performance cache table 306 illustrated in FIG. 3 comprising performance points assigned to different nodes (e.g., nodes 308 denoted as Workers 1, 2, 3, N in FIG. 3) of a system based on execution of one or more workload types (e.g., workload types 302 denoted Workload A, Workload B, Workload K in FIG. 3) by the different nodes.

Figure 3:
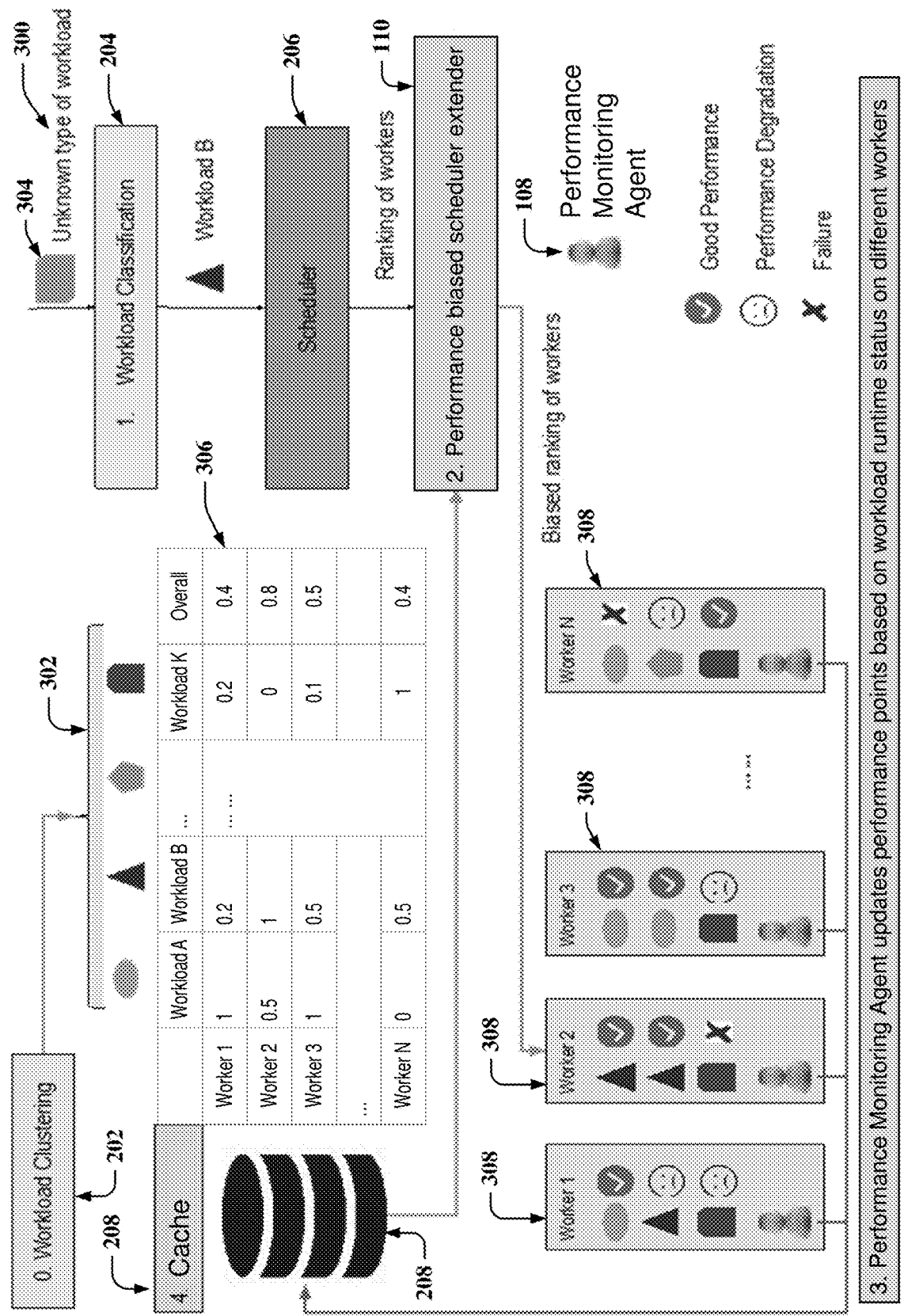
FIG. 3 illustrates a block diagram of an example, non-limiting system that can facilitate performance biased resource scheduling based on runtime performance of a certain workload type on one or more nodes in accordance with one or more embodiments described herein.

FIG. 3 illustrates a block diagram of an example, non-limiting system 300 that can facilitate performance biased resource scheduling based on runtime performance of a certain workload type on one or more nodes in accordance with one or more embodiments described herein. Repetitive description of like elements and/or processes employed in respective embodiments is omitted for sake of brevity.

In an embodiment, system 300 can comprise a workflow diagram illustrating how performance biased scheduler extender system 102 and/or one or more components thereof can be implemented. As Illustrated by system 300 depicted in FIG. 3, workload clustering component 202 can cluster one or more workload types 302 (denoted in FIG. 3 as Workload A, Workload B, Workload K, where K denotes a total quantity of workload types). Workload types 302 can comprise one or more applications including, but not limited to, containers, pods, and/or another application that can be executed by one or more nodes 308 (denoted in FIG. 3 as Worker 1, Worker 2, Worker 3, Worker N, where N denotes a total quantity of nodes) in a system (e.g., one or more cloud computing nodes 910 in cloud computing environment 950). Workload clustering component 202 can cluster workload types 302 using one or more clustering techniques described above with reference to FIG. 2, Based on such clustering by workload clustering component 202, workload clustering component 202 can input one or more clusters of workload types 302 into a performance cache table 306 that can be stored on cache component 208. In an example, workload clustering component 202 can input one or more clusters of workload types 302 into performance cache table 306 as categories that can be used by workload classification component 204 to classify an unknown workload type 304.

Performance cache table 306 can comprise performance points of nodes 308 assigned and/or updated by performance component 108 based on past runtime performance of nodes 308 in executing a Workload B workload type and/or a workload type similar to Workload B (e.g., as described above with reference to FIG. 1). In an example, performance cache table 306 can comprise a matrix having columns comprising workload types 302 and/or rows comprising nodes 308. In another example, performance cache table 306 can comprise an overall performance point column (denoted as Overall in FIG. 3). Such an overall performance point column can comprise overall performance point values of each of nodes 308 that can be calculated (e.g., via performance component 108, scheduler extender component 110, etc.) using a summing and/or an averaging approach (e.g., a weighted average based on weights of each workload type 302) based on respective performance points of each node 308 corresponding to all workload types 302. In some embodiments, scheduler extender component 110 can utilize such overall performance point values of nodes 308 to generate a performance point based ranking of nodes 308 as described above with reference to FIG. 1.

Unknown workload type 304 can comprise an incoming workload request that can be received by performance biased scheduler extender system 102. For example, unknown workload type 304 can comprise an incoming workload request such as, for instance, a pod request that can be received by performance biased scheduler extender system 102 via an interface component (e.g., an API, a REST API, a GUI, etc.).

Workload classification component 204 can classify unknown workload type 304 as one of the workload types 302. For example, workload classification component 204 can employ one or more classification techniques described above with reference to FIG. 2 to classify unknown workload type 304 as a Workload B workload type of workload types 302 as illustrated in FIG. 3.

Based on such classification (e.g., by workload classification component 204) of unknown workload type 304 as a Workload B workload type, scheduler component 206 can generate a scheduler ranking of nodes 308, which can constitute a scheduling decision to run Workload B on a certain node of nodes 308 based on the ranking of nodes 308 in such a scheduler ranking For example, scheduler component 206 can generate a scheduler ranking of nodes 308 based on certain criteria as described above with reference to HG. 2.

Based on such classification (e.g., by workload classification component 204) of unknown workload type 304 as a Workload B workload type and/or generation (e.g., by scheduler component 206) of a scheduler ranking, scheduler extender component 110 can obtain performance points corresponding to a Workload B workload type that have been previously assigned based on past execution of such a workload type and/or a similar workload type on one or more of nodes 308. For instance, scheduler extender component 110 can employ processor 106 to collect (e.g., via read and/or write commands) from cache component 208 the performance point values 0.2, 1, 0.5, and 0.5 of Workers 1, 2, 3, and N, respectively as depicted in FIG. 3. Such performance points can be indicative of performance points that can be expected (expected performance points) based on future execution of the Workload B workload type and/or a similar workload type by Workers 1, 2, 3, N.

Scheduler extender component 110 can modify a scheduling decision of scheduler component 206 to run Workload B on a certain node of nodes 308. For example, as described above with reference to 1, scheduler extender component 110 can modify such a scheduling decision by ranking nodes 308 based on the performance points obtained from performance cache table 306 and biasing (e.g., adjusting, modifying, replacing, weighting, etc.) the scheduler ranking generated by scheduler component 206 according to the performance points based ranking generated by scheduler extender component 110. For instance, as illustrated in FIG. 3, by biasing the scheduler ranking generated by scheduler component 206 according to the performance points based ranking generated by scheduler extender component 110, scheduler extender component 110 can thereby modify a scheduling decision of scheduler component 206 to run Workload B on a certain node of nodes 308 such that Workload B can be placed (e.g., scheduled, executed) on Worker 2.

Based on placement of Workload B on Worker 2 by scheduler extender component 110, performance component 108 (denoted as Performance Monitoring Agent in FIG. 3) can monitor the execution (e.g., runtime performance) of Workload B by Worker 2 to determine whether Worker 2 executes Workload B successfully functions and/or services of Workload B completed) or unsuccessfully (e.g., run failures and/or performance degradation occurs during execution). Based on such execution of Workload B by Worker 2 as monitored by performance component 108, performance component 108 can update and/or report a performance point value of Worker 2 corresponding to Workload B in performance cache table 306 as described above with reference to FIG. 1.

Figure 4:
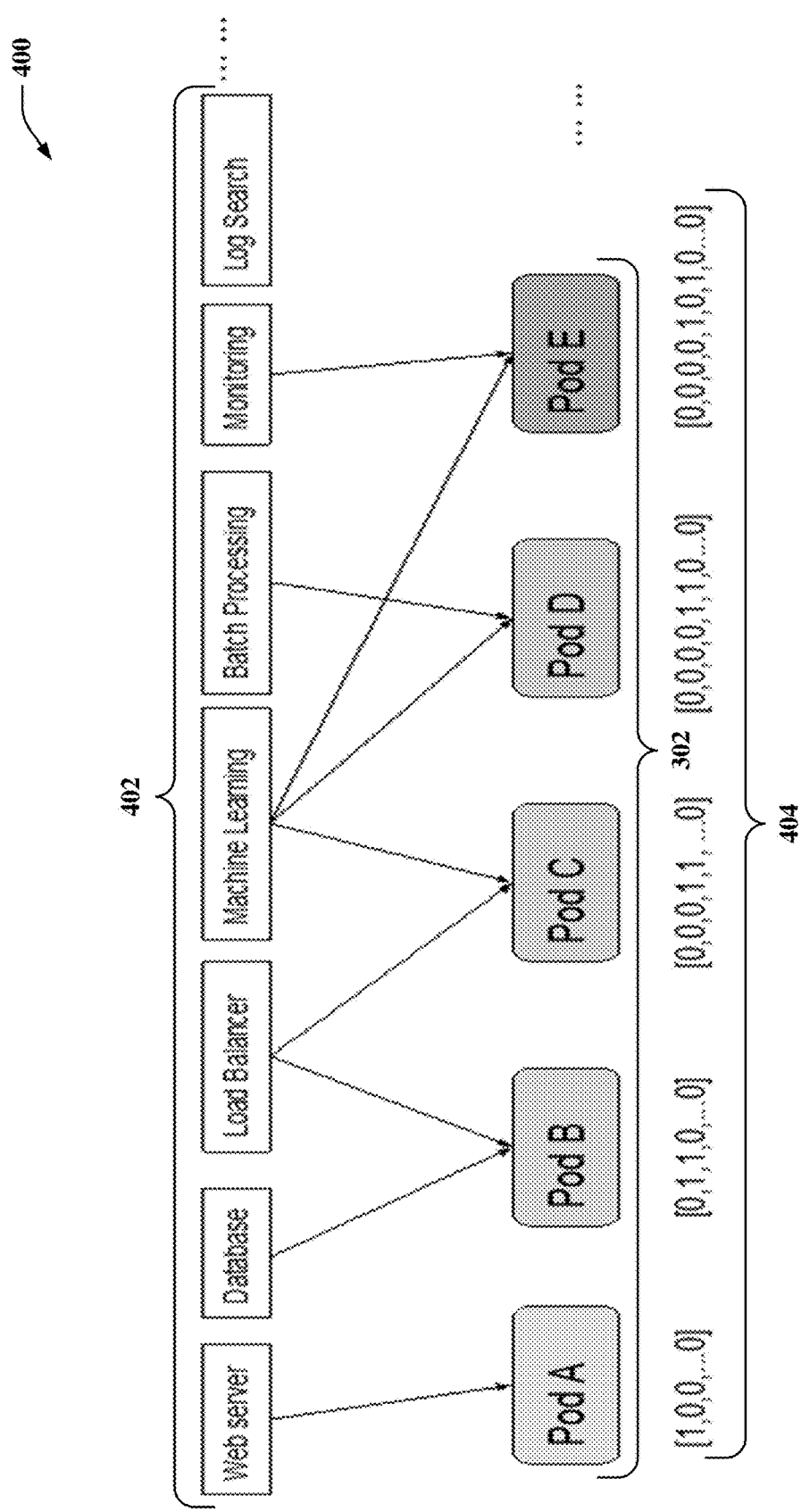
FIG. 4 illustrates a diagram of an example, non-limiting system that can facilitate performance biased resource scheduling based on runtime performance of a certain workload type on one or more nodes in accordance with one or more embodiments described herein.

FIG. 4 illustrates a diagram of an example, non-limiting system 400 that can facilitate performance biased resource scheduling based on runtime performance of a certain workload type on one or more nodes in accordance with one or more embodiments described herein. Repetitive description of like elements and/or processes employed in respective embodiments is omitted tor sake of brevity.

System 400 can comprise a pod clustering system that can be employed by workload clustering component 202 to determine (e.g., via one or more clustering techniques described above with reference to FIG. 2) at least one of a quantity or a type of one or more workload types (e.g., workload types 302) that can be executed by one or more nodes (e.g., nodes 308) in a system (e.g., cloud computing environment 950). Similarly, system 400 can comprise a pod classification system that can be employed by workload classification component 204 to classify (e.g., via one or more classification techniques described above with reference to FIG. 2) a workload type (e.g., unknown workload type 304) as one of the one or more workload types.

System 400 can comprise one or more workload types 302, which can comprise one or more pods (denoted Pod A, Pod B, Pod C, Pod D, and Pod E in FIG. 4) that can each comprise a group of containers that can be deployed together on the same host (e.g., one of nodes 308) to perform one or more functionalities, Such containers can comprise one or more container images 402 (denoted as Web server, Database, Load Balancer, Machine Learning, Batch Processing, Monitoring, and Log Search in FIG. 4) that can each comprise features (e.g., container image repo, image name, image version, etc.). Such features can be used by workload clustering component 202 to cluster workload types 302 and/or by workload classification component 204 to classify unknown workload type 304. For instance, if two pods (e,g., Pod B and Pod C) comprise containers run from the same set of container images 402 (e.g., Load Balancer), the pods can be represented by a binary vector (e.g., feature vector) denoting what images they have (e.g., as illustrated by feature vectors 404 in FIG. 4). In this example, such a binary vector (e.g., feature vector) can be used by workload clustering component 202 to cluster workload types 302 (e.g., Pods A, B, C, D, E) anchor by workload classification component 204 to classify unknown workload type 304 (e.g., an unknown incoming pod).

FIG. 5 illustrates a diagram of an example, non-limiting information 500 that can facilitate performance biased resource scheduling based on runtime performance of a certain workload type on one or more nodes in accordance with one or more embodiments described herein. Repetitive description of like elements and/or processes employed in respective embodiments is omitted for sake of brevity.

Information 500 can comprise an illustration of a monitoring dashboard 502 of an interface component (e.g., a GUI) of performance biased scheduler extender system 102 that can render (e.g., via a monitor, display, screen, etc.) performance points (e.g., scaled performance points) of one or more workload types (denoted as Pod type 1 and Pod type 2 in FIG. 5) across multiple nodes (denoted Worker 1, Worker 2, and Worker N in FIG. 5). Such an interface component (e.g., a GUI) of performance biased scheduler extender system 102 can further comprise a biased scheduler enable window 504 that can be utilized by an entity implementing performance biased scheduler extender system 102 to enable the various functions of performance biased scheduler extender system 102 in accordance with one or more embodiments described herein.

Performance biased scheduler extender system 102 can be associated with various technologies. For example, performance biased scheduler extender system 102 can be associated with scheduler technologies, container technologies, container-orchestration technologies, artificial intelligence technologies, machine learning technologies, computer technologies, server technologies, cloud computing technologies, information technology (IT) technologies, internet-of-things (IoT) technologies, automation technologies, and/or other technologies.

Performance biased scheduler extender system 102 can provide technical improvements to systems, devices, components, operational steps, and/or processing steps associated with the various technologies identified above, For example, performance biased scheduler extender system 102 can automatically: assigns performance points to different nodes based on execution (e.g., successful or unsuccessful execution) of one or more workload types executed on the different nodes; and/or modify a scheduling decision (e.g., a scheduler ranking) to run a workload type on a node based on the performance points. For instance, performance biased scheduler extender system 102 can employ performance component 108 to monitor the workload runtime performance and/or failures of a certain type of workload executed on different nodes, and/or model the runtime performance results (e.g., performance issues, failures, etc.) as performance points that can be used to bias a scheduling decision (e.g., a scheduler ranking) generated by scheduler component 206. Failures and/or performance issues (e.g., causing negative affects) due to placing a certain type of workload on certain nodes that are prone to fail, can thereby be detected at runtime by scheduler extender component 110. For example, such failures and/or performance issues can be modeled by performance component 108 as negative performance points (e.g., denoted by numerical values of 0 or values between 0-1) that can be used by scheduler extender component 110 to bias a scheduler ranking according to a performance point based ranking generated by scheduler extender component 110 based on the negative performance points. Based on such biasing, performance biased scheduler extender system 102 (e.g., via performance component 108 and/or scheduler extender component 110) can thereby prevent scheduler component 206 from placing such a workload type and/or a similar workload type on such certain nodes in the future. Biasing scheduler component 206 with runtime system states can adaptively improve the scheduling decisions according to dynamics in a system such as, for instance, a cloud computing environment (e.g., container Cloud). Performance biased scheduler extender system 102 is especially useful when some unexpected failures occur in such a system.

Performance biased scheduler extender system 102 can provide technical improvements to a processing unit processor 106) associated with a classical computing device and/or a quantum computing device a quantum processor, quantum hardware, superconducting circuit, etc.). For example, based on such biasing by scheduler extender component 110 of a scheduler ranking generated by scheduler component 206 as described above, performance biased scheduler extender system 102 can ensure that a certain workload type that has been successfully executed on a certain node can be executed on such a node in the future; and/or alternatively, a certain workload type that has failed on a certain node will not be executed on such a node in the future, As such, performance biased scheduler extender system 102 can thereby facilitate: improved performance of the certain workload type and/or the certain node; improved performance and/or efficiency of a processing unit (e.g., processor 106) associated with performance biased scheduler extender system 102; and/or improved performance and/or efficiency of a processing unit (e.g., processor 106) associated with the certain node that executes the certain workload type. Such improved performance and/or efficiency of such a processing unit (e.g., processor 106) associated with performance biased scheduler extender system 102 and/or the certain node can result in reduced computation cost of such a processing unit.

Performance biased scheduler extender system 102 can employ hardware or software to solve problems that are highly technical in nature, that are not abstract and that cannot be performed as a set of mental acts by a human. Some of the processes described herein can be performed by one or more specialized computers (e.g., one or more specialized processing units, a specialized quantum computer, etc.) for carrying out defined tasks related to the various technologies identified above. Performance biased scheduler extender system 102 and/or components thereof, can be employed to solve new problems that arise through advancements in technologies mentioned above, employment of quantum computing systems, cloud computing systems, computer architecture, and/or another technology.

It is to be appreciated that performance biased scheduler extender system 102 can utilize various combinations of electrical components, mechanical components, and circuitry that cannot be replicated in the mind of a human or performed by a human, as the various operations that can be executed by performance biased scheduler extender system 102 and/or components thereof as described herein are operations that are greater than the capability of a human mind. For instance, the amount of data processed, the speed of processing such data, or the types of data processed by performance biased scheduler extender system 102 over a certain period of time can be greater, faster, or different than the amount, speed, or data type that can be processed by a human mind over the same period of time.

According to several embodiments, performance biased scheduler extender system 102 can also be fully operational towards performing one or more other functions lay powered on, fully executed, etc.) while also performing the various operations described herein. It should be appreciated that such simultaneous multi-operational execution is beyond the capability of a human mind. It should also be appreciated that performance biased scheduler extender system 102 can include information that is impossible to obtain manually by an entity, such as a human user. For example, the type, amount, or variety of information included in performance biased scheduler extender system 102, performance component 108, scheduler extender component 110, workload clustering component 202, workload classification component 204, scheduler component 206, cache component 208, and/or system 300 can be more complex than information obtained manually by a human user.

Figure 6:
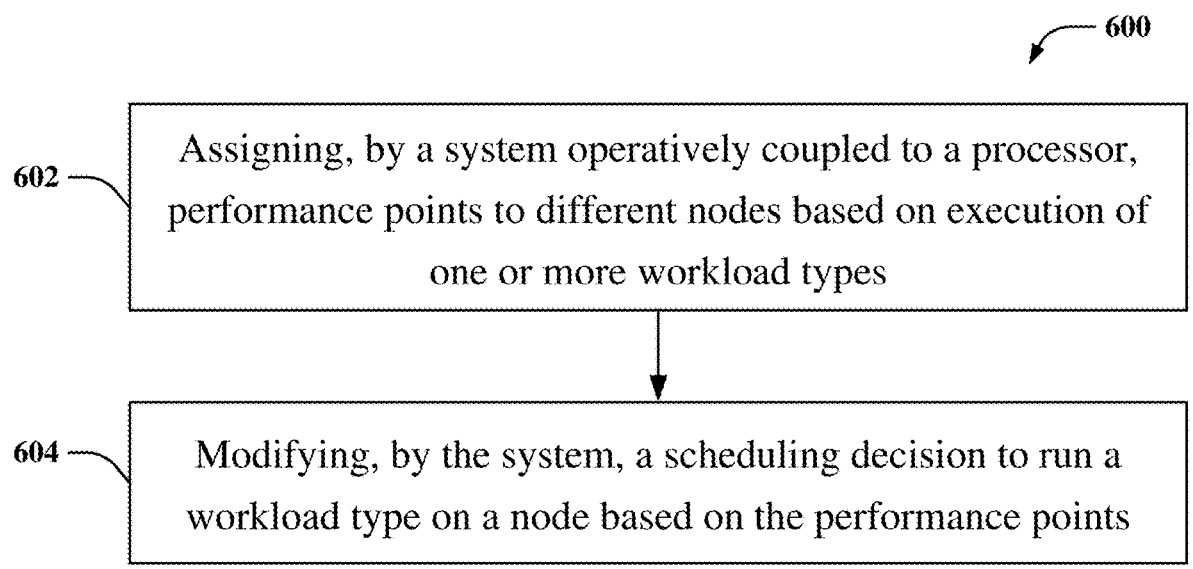
FIG. 6 illustrates a flow diagram of an example, non-limiting computer-implemented method that can facilitate performance biased resource scheduling based on runtime performance of a certain workload type on one or more nodes in accordance with one or more embodiments described herein.

FIG. 6 illustrates a flow diagram of an example, non-limiting computer-implemented method 600 that can facilitate performance biased resource scheduling based on runtime performance of a certain workload type on one or more nodes in accordance with one or more embodiments described herein. Repetitive description of like elements and/or processes employed in respective embodiments is omitted for sake of brevity.

At 602, computer-implemented method 600 can comprise assigning, by a system (e.g., via performance biased scheduler extender system 102 and/or performance component 108) operatively coupled to a processor (e.g., processor 106, a quantum processor, etc.), performance points (e.g., numerical values) to different nodes (e.g., nodes 308) based on execution (e.g., successful or unsuccessful execution) of one or more workload types (e.g., workload types 302).

At 604, computer-implemented method 600 can comprise modifying, by the system (e.g., via performance biased scheduler extender system 102 and/or scheduler extender component 110), a scheduling decision (e.g., a scheduler ranking generated by scheduler component 206) to run a workload type Workload B illustrated in FIG. 3) on a node (e,g., a node of nodes 308) based on the performance points.

Figure 7:
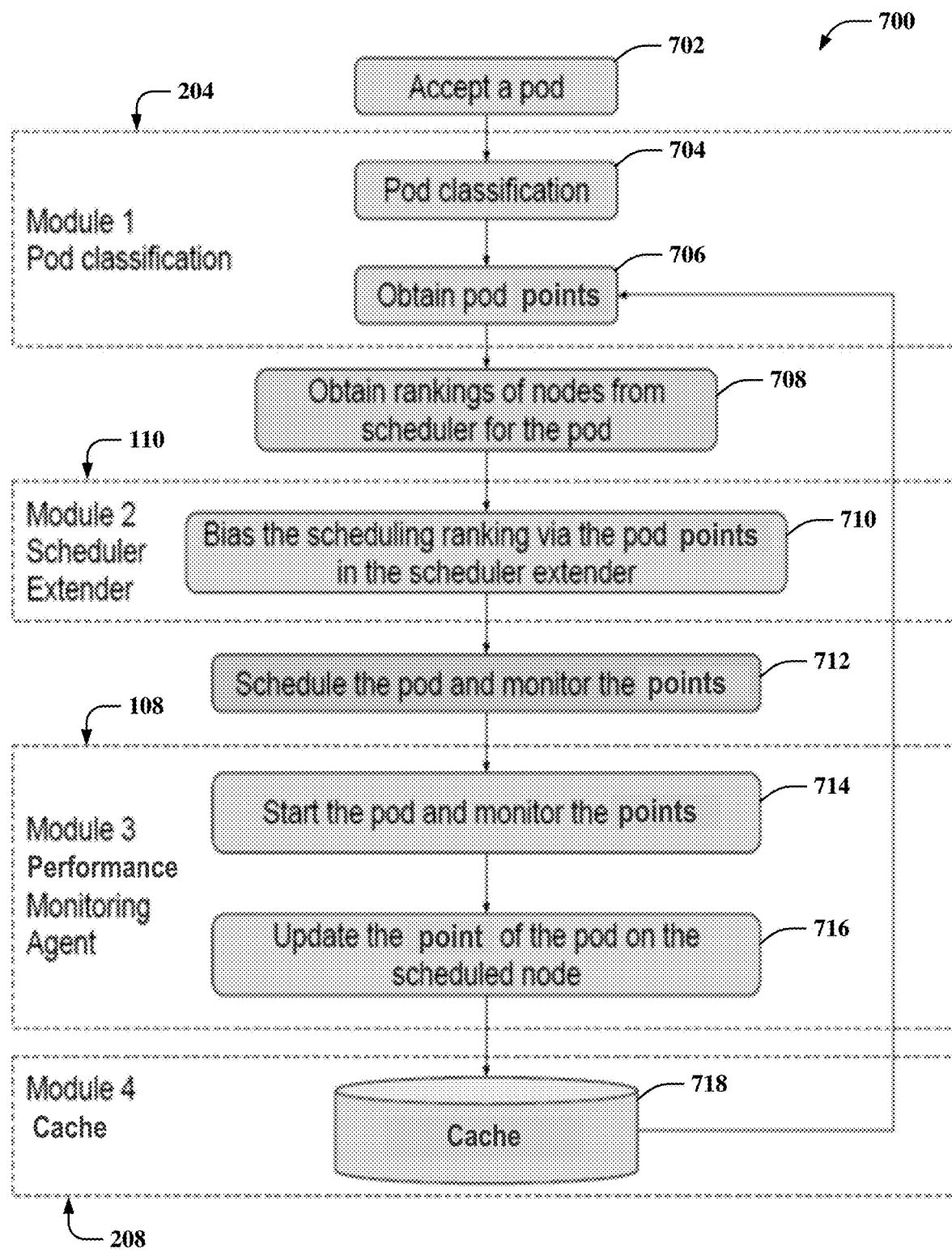
FIG. 7 illustrates a flow diagram of an example, non-limiting computer-implemented method that can facilitate performance biased resource scheduling based on runtime performance of a certain workload type on one or more nodes in accordance with one or more embodiments described herein.

FIG. 7 illustrates a flow diagram of an example, non-limiting computer-implemented method 700 that can facilitate performance biased resource scheduling based on runtime performance of a certain workload type on one or more nodes in accordance with one or more embodiments described herein, Repetitive description of like elements and/or processes employed in respective embodiments is omitted for sake of brevity.

Computer-implemented method 700 can be implemented by performance biased scheduler extender system 102 and/ or one or more components thereof in a container-orchestration system to facilitate performance of the various functions of the subject disclosure in accordance with one or more embodiments described herein. Module 1 depicted in 7 can be performed by workload classification component 204. Module 2 depicted in FIG. 7 can be performed by scheduler extender component 110. Module 3 depicted in FIG. 7 can be performed by performance component 108. Module 4 depicted in FIG. 7 can be performed by cache component 208.

At 702, computer-implemented method 700 can comprise accepting (e via an interface component (e.g., an API, a REST API, a GUI, etc.) of performance biased scheduler extender system 102) a pod (e.g., unknown workload type 304).

At 704, computer-implemented method 700 can comprise classifying (e.g., via performance biased scheduler extender system 102 and/or workload classification component 204) the pod.

At 706, computer-implemented method 700 can comprise obtaining (e,g., via. performance biased scheduler extender system 102, processor 106, and/or scheduler extender component 110) one or more performance points corresponding to the pod. For example, scheduler extender component 110 can employ processor 106 to collect (e.g., via read and/or write commands) one or more performance points from performance cache table 306 that can be stored on cache component 208 as described above with reference to FIG. 3.

At 708, computer-implemented method 700 can comprise obtaining (e.g., via performance biased scheduler extender system 102, scheduler extender component 110, and/or scheduler component 206) rankings of nodes (e.g., a scheduler ranking of the nodes) from a scheduler (e.g., scheduler component 206) for the pod.

At 710, computer-implemented method 700 can comprise biasing (e.g., via performance. biased scheduler extender system 102 and/or scheduler extender component 110) the scheduling ranking via (e.g., based on) the pod performance points in the scheduler extender (e.g., in scheduler extender component 110).

At 712, computer-implemented method 700 can comprise scheduling (e.g., via performance biased scheduler extender system 102, scheduler extender component 110, and/or scheduler component 206) the pod and monitoring (e.g., via performance component 108) the performance points.

At 714, computer-implemented method 700 can comprise starting (e.g., via performance biased scheduler extender system 102, scheduler extender component 110, and/or scheduler component 206) the pod and monitoring the performance points via performance component 108).

At 716, computer-implemented method 700 can comprise updating (e.g., via performance biased scheduler extender system 102 and/or performance component 108) the performance point of the pod on the scheduled node. For example, performance component 108 can update (e.g., in performance cache table 306) a performance point of a node (e.g., Worker 2) of nodes 308 that executed the pod.

At 718, computer-implemented method 700 can comprise storing (e.g., via performance biased scheduler extender system 102, performance component 108, and/or cache component 208) updated performance points in a cache component. For example, cache component 208 can store updated performance points reported by performance component 108 in a current version of performance cache table 306 stored on cache component 208. Such updated performance points can be obtained from such a current version of performance cache table 306 by scheduler extender component 110 as described above at 706.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be performed to implement the computer-implemented methodologies in accordance with the disclosed subject matter, In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
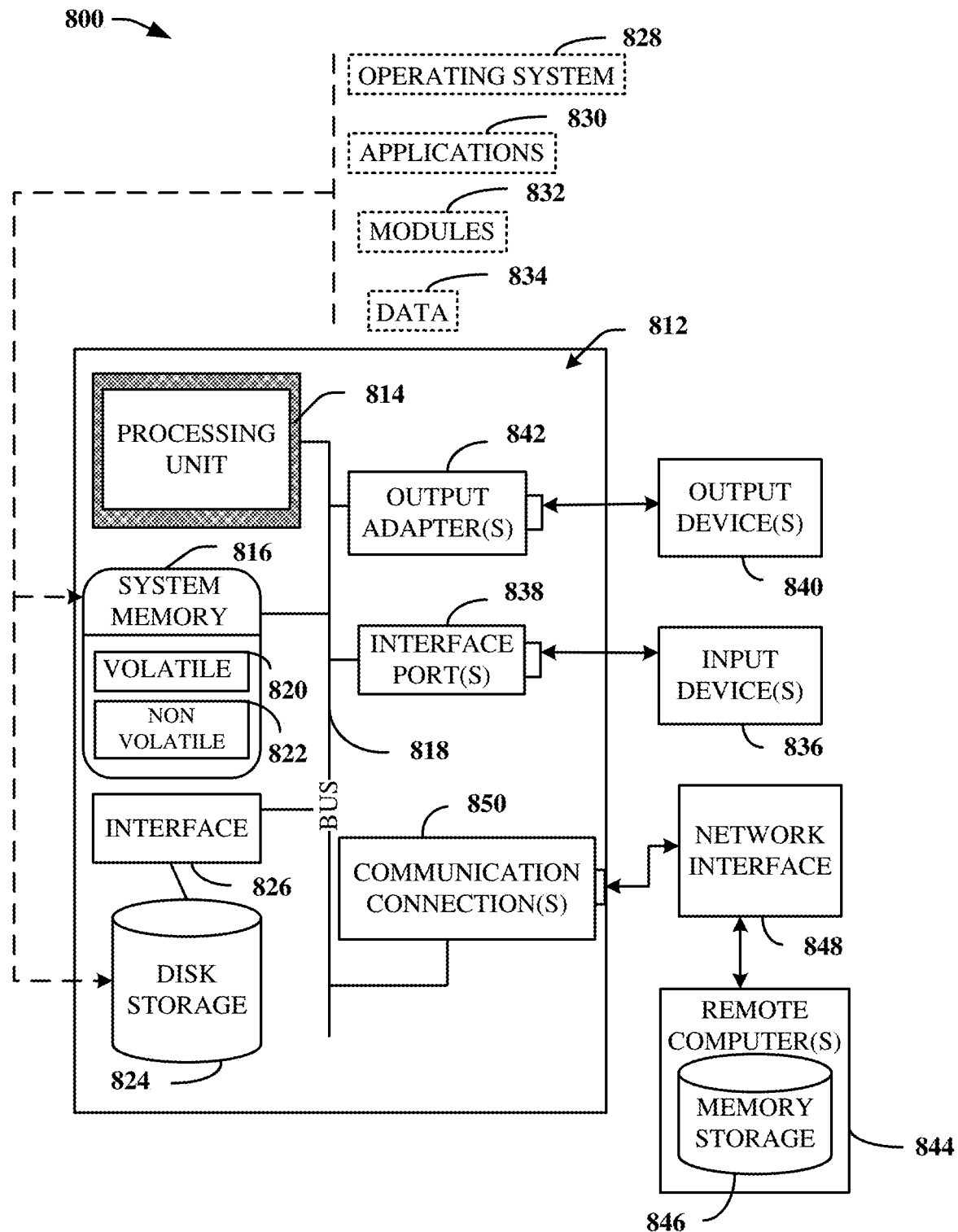
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like, These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818, It should be noted that other devices and/or systems of devices provide both input and output capabilities such as remote computer(s) 844.

Computer 812 can operate in a networked environment using logical connections to one or more remote computers, such as remote computer(s) 844, The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL-modems, ISDN adapters, and Ethernet cards.

Figure 9:
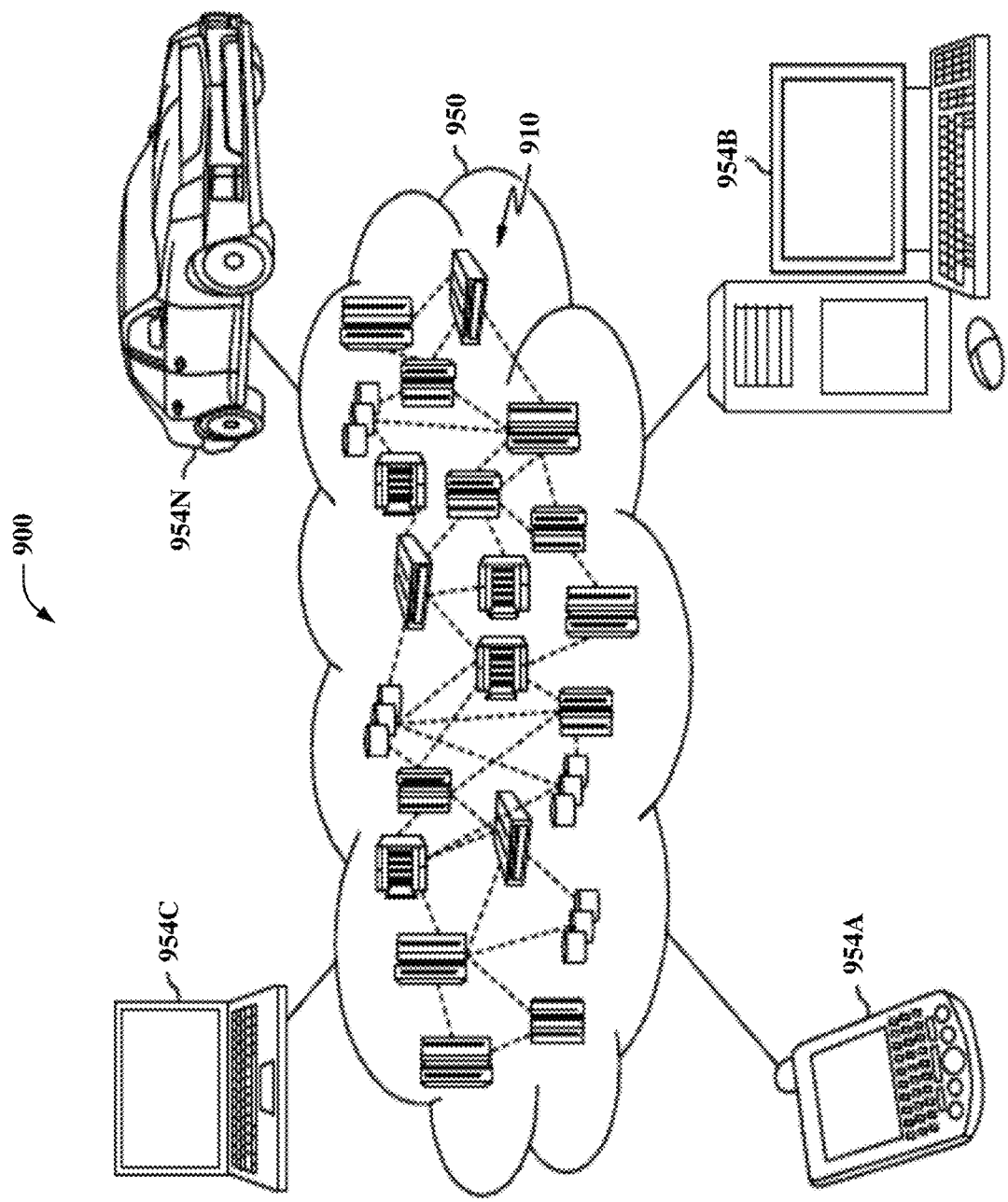
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof, This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
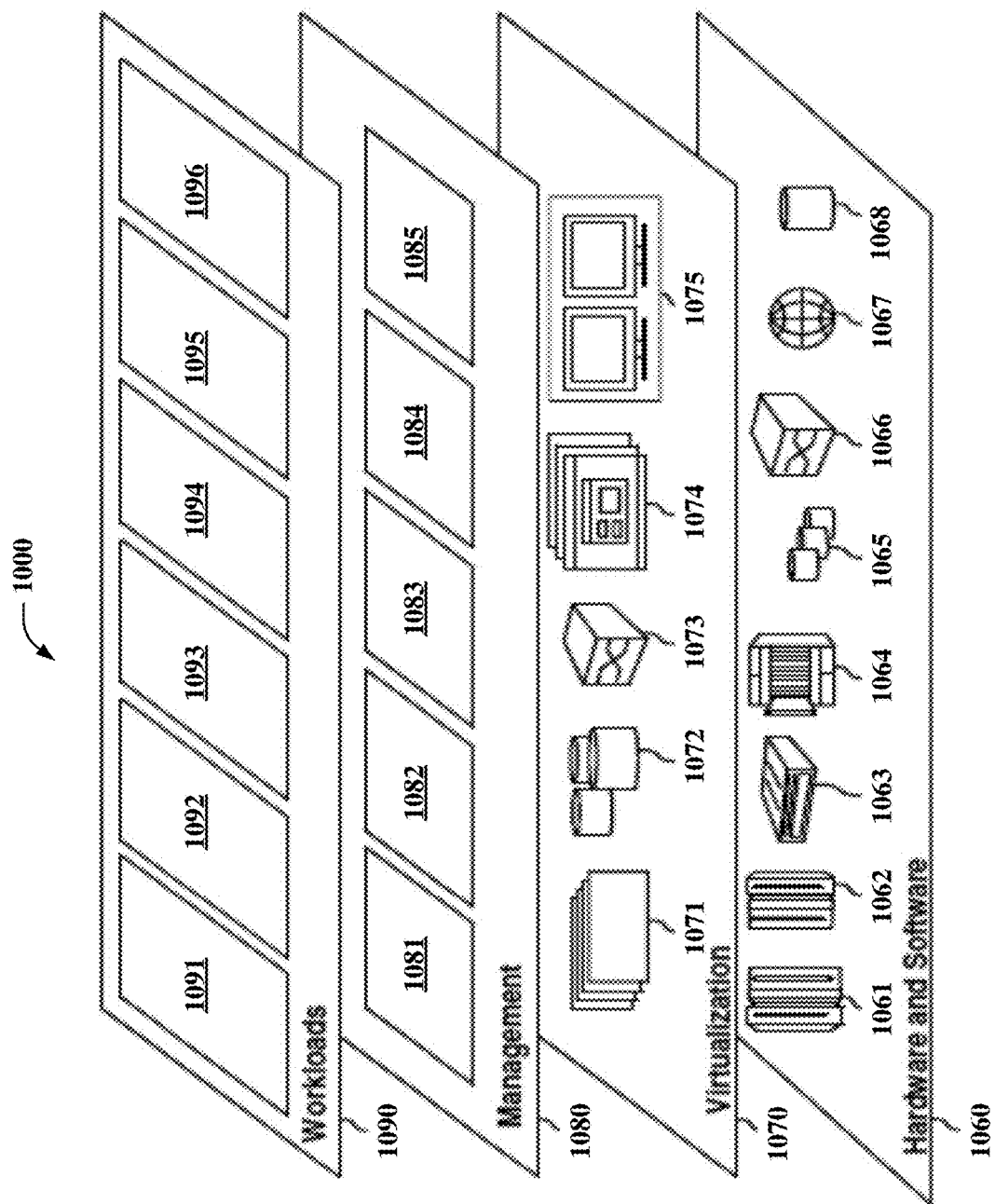
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and. embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions Which may be provided from this layer include: mapping and navigation 1091; software development and lifecycle management 1092; virtual classroom education delivery 1093; data analytics processing 1094; transaction processing 1095; and performance biased scheduler extender software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area. network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the users computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that, this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a. component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory, By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM), Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (I)DR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a performance component that assigns performance points to different nodes based on execution of one or more workload types; and
        a scheduler extender component that modifies a scheduling decision to run a workload type on a node based on the performance points, wherein the performance points comprise distinct numerical values, wherein a first one of the distinct numerical values is indicative of whether the execution of the one or more workload types was successful, a second one of the distinct numerical values is indicative of whether the execution of the one or more workload types was unsuccessful and a third one of the distinct numerical values is indicative of whether the execution of the one or more workload types was partially successful and partially unsuccessful,
    wherein the performance component:
        monitors runtime performance of at least one of the workload type run on the node or the one or more workload types run on the different nodes; and
        updates one or more performance points of at least one of the node or the different nodes based on the runtime performance.

2. The system of claim 1, wherein the computer executable components further comprise:
    a workload clustering component that determines at least one of a quantity or a type of the one or more workload types.

3. The system of claim 1, wherein the computer executable components further comprise:
    a workload classification component that classifies the workload type as one of the one or more workload types.

4. The system of claim 1, wherein the performance component assigns the performance points based on at least one of: runtime performance of at least one of the different nodes in executing the one or more workload types; failure rate of the one or more workload types executed by at least one of the different nodes; one or more attributes of at least one of the different nodes; one or more attributes of the one or more workload types; or at least one defined workload execution objective.

5. The system of claim 1, wherein scheduler extender component ranks the different nodes based on one or more performance points of the different nodes corresponding to the workload type.

6. The system of claim 1, wherein scheduler extender component adjusts a scheduler ranking of the different nodes based on one or more performance points of the different nodes corresponding to the workload type, thereby facilitating improved performance of at least one of the workload type, the node, or the processor.

7. A computer-implemented method, comprising:
    assigning, by a system operatively coupled to a processor, performance points to different nodes based on execution of one or more workload types, wherein the performance points comprise distinct numerical values indicative of whether the execution of the one or more workload types was successful, unsuccessful or partially successful, wherein a first performance point of the performance points is first one of the numerical values based on a determination that the execution was successful, wherein a second performance point of the performance points is a second one of the numerical values based on a determination that the execution was partially successful and partially unsuccessful, and wherein a third performance point of the performance points is a third one of the numerical values based on a determination that the execution was unsuccessful; and
    modifying, by the system, a scheduling decision to run a workload type on a node based on the performance points;
    monitoring, by the system, runtime performance of at least one of the workload type run on the node or the one or more workload types run on the different nodes; and
    updating, by the system, one or more performance points of at least one of the node or the different nodes based on the runtime performance.

8. The computer-implemented method of claim 7, wherein the first one of the numerical values is 1, wherein the second one of the numerical values is between 0 and 1 and wherein the third one of the numerical values is 0, the computer-implemented method further comprising:
    determining, by the system, at least one of a quantity or a type of the one or more workload types.

9. The computer-implemented method of claim 7, further comprising:
    classifying, by the system, the workload type as one of the one or more workload types.

10. The computer-implemented method of claim 7, wherein the assigning comprises assigning, by the system, the performance points based on at least one of: runtime performance of at least one of the different nodes in executing the one or more workload types; failure rate of the one or more workload types executed by at least one of the different nodes; one or more attributes of at least one of the different nodes; one or more attributes of the one or more workload types; or at least one defined workload execution objective.

11. The computer-implemented method of claim 7, further comprising:
    ranking, by the system, the different nodes based on one or more performance points of the different nodes corresponding to the workload type.

12. The computer-implemented method of claim 7, further comprising:

adjusting, by the system, a scheduler ranking of the different nodes based on one or more performance points of the different nodes corresponding to the workload type, thereby facilitating improved performance of at least one of the workload type, the node, or the processor.

13. A computer program product facilitating performance biased resource scheduling based on runtime performance of a certain workload type on one or more nodes, the computer program product comprising a computer readable storage medium having program instructions embodied therewith, the program instructions executable by a processor to cause the processor to:

assign, by the processor, performance points to different nodes based on execution of one or more workload types, wherein the performance points comprise distinct numerical values indicative of whether the execution of the one or more workload types was successful or unsuccessful;

modify, by the processor, a scheduling decision to run a workload type on a node based on the performance points;

monitor, by the processor, runtime performance of at least one of the workload type run on the node or the one or more workload types run on the different nodes; and update, by the processor, one or more performance points of at least one of the node or the different nodes based on the runtime performance.

14. The computer program product of claim 13, wherein the program instructions are further executable by the processor to cause the processor to:

determine, by the processor, at least one of a quantity or a type of the one or more workload types; and classify, by the processor, the workload type as one of the one or more workload types.

15. The computer program product of claim 13, wherein the program instructions are further executable by the processor to cause the processor to:

assign, by the processor, the performance points based on at least one of: runtime performance of at least one of the different nodes in executing the one or more workload types; failure rate of the one or more workload types executed by at least one of the different nodes; one or more attributes of at least one of the different nodes; one or more attributes of the one or more workload types; or at least one defined workload execution objective.

16. The computer program product of claim 13, wherein the program instructions are further executable by the processor to cause the processor to:

rank, by the processor, the different nodes based on one or more performance points of the different nodes corresponding to the workload type.

17. The computer program product of claim 13, wherein the program instructions are further executable by the processor to cause the processor to:

adjust, by the processor, a scheduler ranking of the different nodes based on one or more performance points of the different nodes corresponding to the workload type.

* * * * *